United States Patent [19]

Somes

[11] Patent Number: 5,553,509
[45] Date of Patent: Sep. 10, 1996

[54] THREE DEGREE OF FREEDOM ROBOTIC MANIPULATOR CONSTRUCTED FROM ROTARY DRIVES

[76] Inventor: Steven D. Somes, 8840 Eagle Rd., Kirtland, Ohio 44094

[21] Appl. No.: 458,721

[22] Filed: Jun. 2, 1995

Related U.S. Application Data

[63] Continuation-in-part of Ser. No. 63,952, May 20, 1993, Pat. No. 5,429,015.

[51] Int. Cl.$^6$ ..................................................... B25J 9/04
[52] U.S. Cl. .................... 74/89.2; 74/490.04; 74/665 L; 414/744.2; 474/65; 474/66; 474/84; 901/15; 901/21; 901/23
[58] Field of Search ............................... 414/729, 744.2; 901/15, 21, 23; 74/89.2, 89.22, 490.04, 665 L, 665 P; 474/64, 65, 66, 84

[56] References Cited

U.S. PATENT DOCUMENTS

| Re. 32,414 | 5/1987 | Hutchins et al. | 74/89.22 |
|---|---|---|---|
| 3,534,634 | 10/1970 | Kawanami | 74/722 |
| 4,188,837 | 2/1980 | Bendall | 74/665 M |
| 4,419,041 | 12/1983 | Rose | 414/729 X |
| 4,557,662 | 12/1985 | Teraughi et al. | 414/744 R |
| 4,784,010 | 11/1988 | Wood et al. | 901/21 X |
| 4,896,809 | 1/1990 | Koyanagi | 226/188 |
| 5,046,375 | 9/1991 | Salisbury, Jr. et al. | 901/21 X |
| 5,105,672 | 4/1992 | Carson et al. | 74/89.22 |
| 5,162,713 | 11/1992 | Mohri et al. | 901/15 X |

FOREIGN PATENT DOCUMENTS

| 0364269 | 4/1990 | European Pat. Off. . |
|---|---|---|
| 0297327 | 11/1989 | Japan . |
| 1677422 | 9/1991 | U.S.S.R. . |
| 903602 | 8/1962 | United Kingdom . |

OTHER PUBLICATIONS

Conceptual Drawing For Roto-Lok® Driven Scara Robot, 7 Jun. 91.

*Primary Examiner*—Charles A. Marmor
*Assistant Examiner*—Nathan O. Jensen

[57] ABSTRACT

A three degree-of-freedom robotic manipulator is constructed from three rotary drives. The rotary drive consists of a relatively small diameter cylindrical driving member coupled to a larger diameter cylindrical driven member. The driven member of a second rotary drive is mounted perpendicularly to the driven member of a first drive. The driven member of a third drive is mounted to the periphery of the driven member of the second drive with its axis of rotation parallel to the driven member of the second drive. The driving member of the third drive is located with its axis of rotation coincident with the axis of rotation of the driven member of the second drive. Motors powering the second and third driving members are mounted to the driven member of the first drive roughly centered over its axis of rotation. An extension arm for mounting the end effector is fixed to the driven member of the third drive. This arrangement reduces the number of required components and minimizes motor movement to reduce inertia. Performance is higher and the cost is reduced over conventional designs.

18 Claims, 4 Drawing Sheets

THREE DEGREE OF FREEDOM ROBOTIC MANIPULATOR CONSTRUCTED FROM ROTARY DRIVES

CROSS REFERENCE TO RELATED APPLICATION

This application is a continuation-in-part of U.S. application Ser. No. 8/063,952 filed on May 20, 1993, U.S. Pat. No. 5,429,015 and titled "Two Degree Of Freedom Robotic Manipulator Constructed From Rotary Drives", the entire disclosure of which is incorporated herein by reference.

BACKGROUND OF THE INVENTION

1. Field of Invention

This invention relates to a three degree-of-freedom positioning and manipulating apparatus, and, more particularly, to a three degree-of-freedom manipulating apparatus constructed from three rotary drives.

2. Description of the Prior Art

Three degree-of-freedom manipulators as commonly employed in industrial robots generally follow one of two design methods. The first method is shown in FIG. 1. It employs a rotatable base 80, to which is mounted a first arm 20 which can tilt at a controlled angle relative to the base 80. A second arm 40 is mounted to the end of the first arm 20 and can swing at a controlled angle relative to the first arm 20. To reduce inertia, drive motor 60 for the second arm 40 is usually located in line with the joint between the first arm 20 and the base 80 coaxial with drive motor 50. Belts or chains (not shown) are required to deliver torque to rotate the second arm. This introduces compliance and friction in the joint, reducing its positioning accuracy and the speed of its response. The additional components also increase the mass and hence the inertial load on the motors. The masses of drive motors 50 and 60, located outside of the axis of rotation of the base 80, increase the inertia seen by the base 80.

The second design approach, as shown in FIG. 2, also employs a rotating base. Mounted to the base 80 is a four bar linkage 82 which provides an additional two degrees of freedom. Motor 50 controls the relative angle of the linkage 82 to the base 80, while motor 60 controls the angle between the two pairs of links. The motor placement helps to minimize inertia, as the motors do not move with the links. The multiple rigid links improves stiffness over a belted design, however they have more mass and thus contribute greater inertia. With four joints in the linkage, friction will be higher and thus accuracy reduced.

For both of these designs, loads at the end of the long links create large inertias. To control these inertias without using exceptionally large motors, transmission reduction mechanisms are added to increase drive torque. These mechanisms typically employ a system of gears, which contribute additional mass, friction, compliance and roughness.

Thus, there is a strong need in the art for a three degree-of-freedom manipulator with reduced friction, inertia, mass, etc.

SUMMARY OF THE INVENTION

The purpose of the invention is to provide a manipulator capable of fast and accurate motion and sensitive force and torque transmission with 3 degrees-of-freedom. This is achieved by mounting a 2 degree-of-freedom manipulator to an additional rotary drive. By rotating the mechanism about an additional axis, 3 spatial degrees-of-freedom are realized.

The centers of gravity of the moving drive motors are positioned close to the axis about which they are rotated for decreased inertia. An extension member for mounting the end effector is added to one of the output drums.

DETAILED DESCRIPTION OF THE PREFERRED EMBODIMENT

Figure 1:
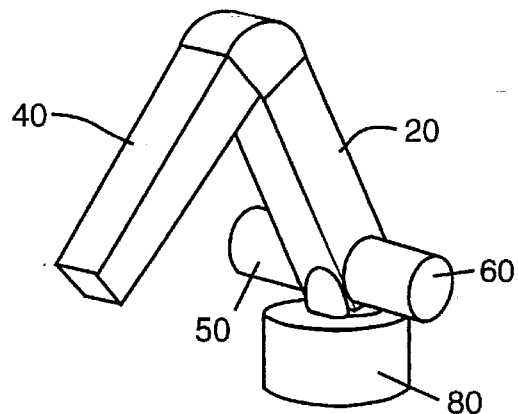
FIGS. 1 and 2 show conventional 3 degree-of-freedom manipulator designs as used in industrial robots.
Figure 2:
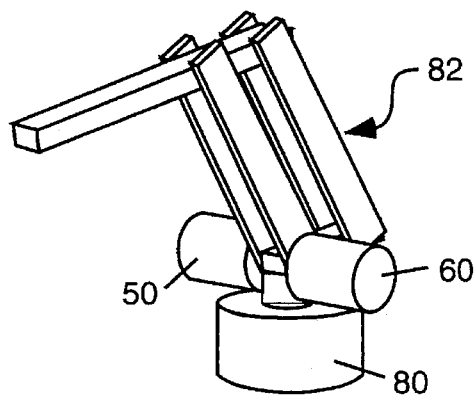

The present invention will now be described with reference to the drawings in which like reference numerals are used to refer to like elements throughout.

Figure 3:
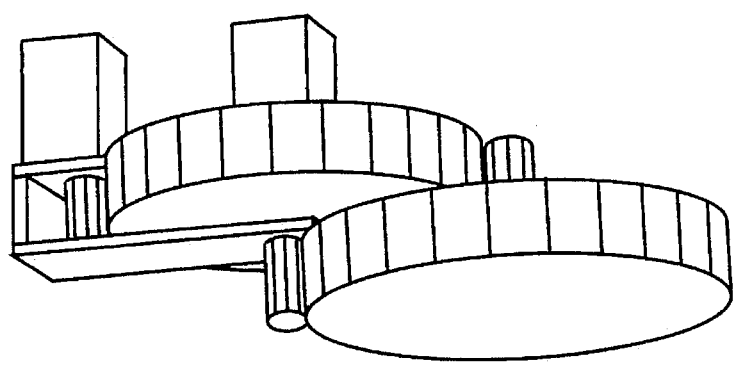
FIG. 3 shows a high performance 2 degree-of-freedom manipulator.
Figure 4:
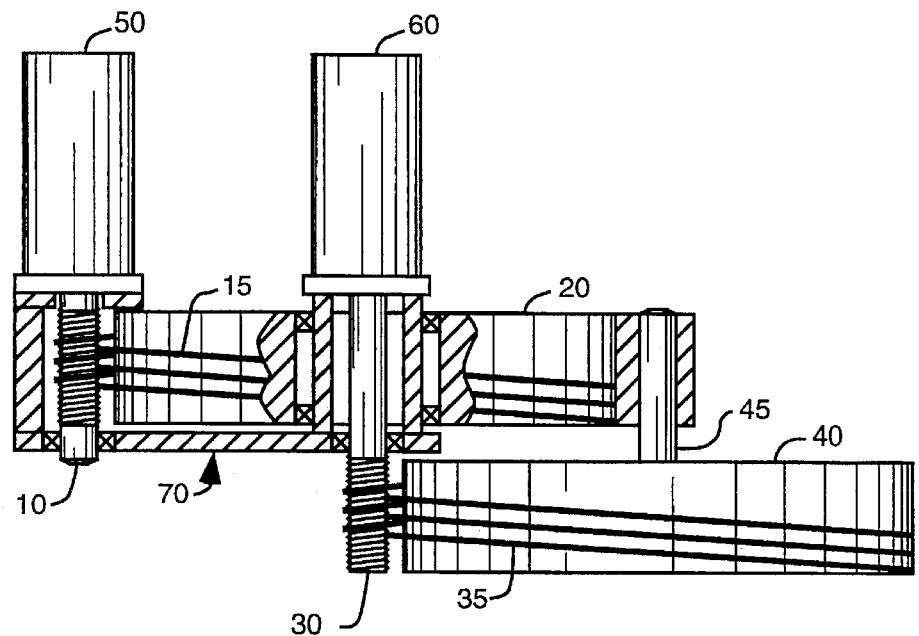
FIG. 4 shows a side view of the high performance 2 degree-of-freedom manipulator with cutaways showing mounting details.

The construction and benefits of a two degree-of-freedom manipulator as shown in FIGS. 3 and 4 are described in related copending application Ser. No. 08/063,952, filed on May 20, 1993, the entire disclosure of which is incorporated herein by reference. With its scarcity and simplicity of components, this 2 degree-of-freedom mechanism offers high performance and economical construction. The motors do not move relative to the motion of the driven drums, so there is no performance penalty for using large motors to achieve rapid accelerations. No belts, chains, or linkages are required to transmit motor torques to the moving members. No additional transmission reduction mechanism is required. The short mechanical distance from motor to the controlled output point allows higher accelerations, more accurate positioning, and more accurate force and torque than competing designs. This design is well suited for applications which require fast and accurate planar motion, as in a SCARA (selective compliance articulated robot arm) industrial robot. However, it is not suited to applications which require high performance in all three translational degrees of freedom.

As discussed below in connection with FIGS. 5 and 6, the present invention provides 3 degrees of freedom by mounting a 2 degree-of-freedom manipulator similar to that shown in FIGS. 3 and 4 to an additional rotary drive. The difference between the two degree-of-freedom mechanism used in the present invention and that disclosed in the copending application and FIGS. 3 and 4 relate only to motor placement. The functionality remains the same. To minimize inertia by locating both the motors and the extension member close to the additional rotary drive's axis of rotation, the motors are located at the opposite end of the driven shafts.

Figure 5:
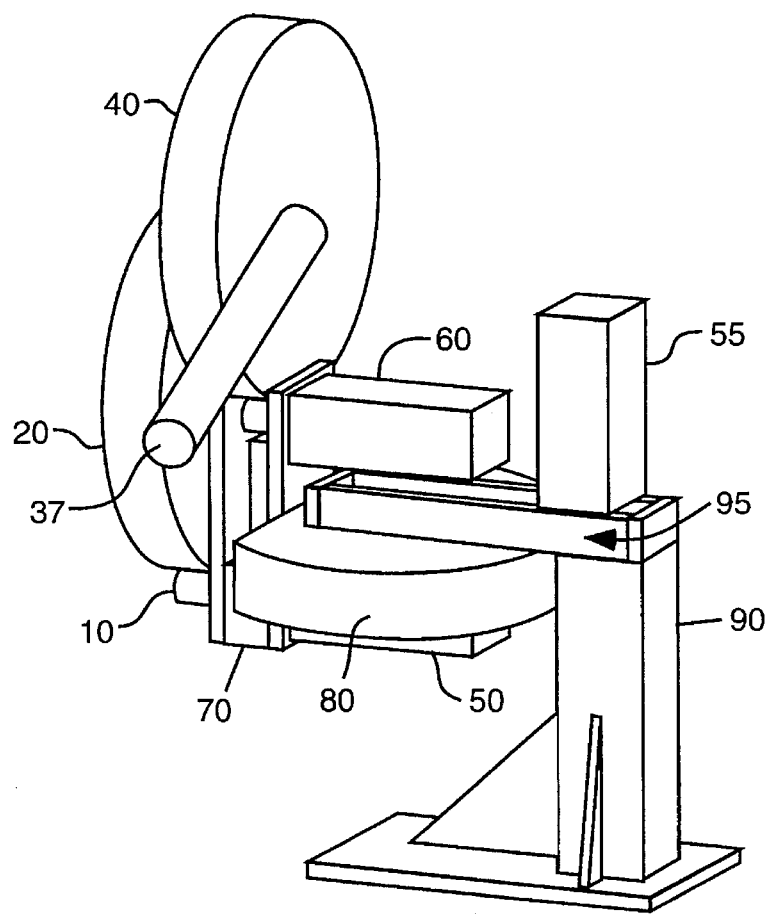
FIG. 5 shows a perspective view of a 3 degree-of-freedom according to the invention.
Figure 6:
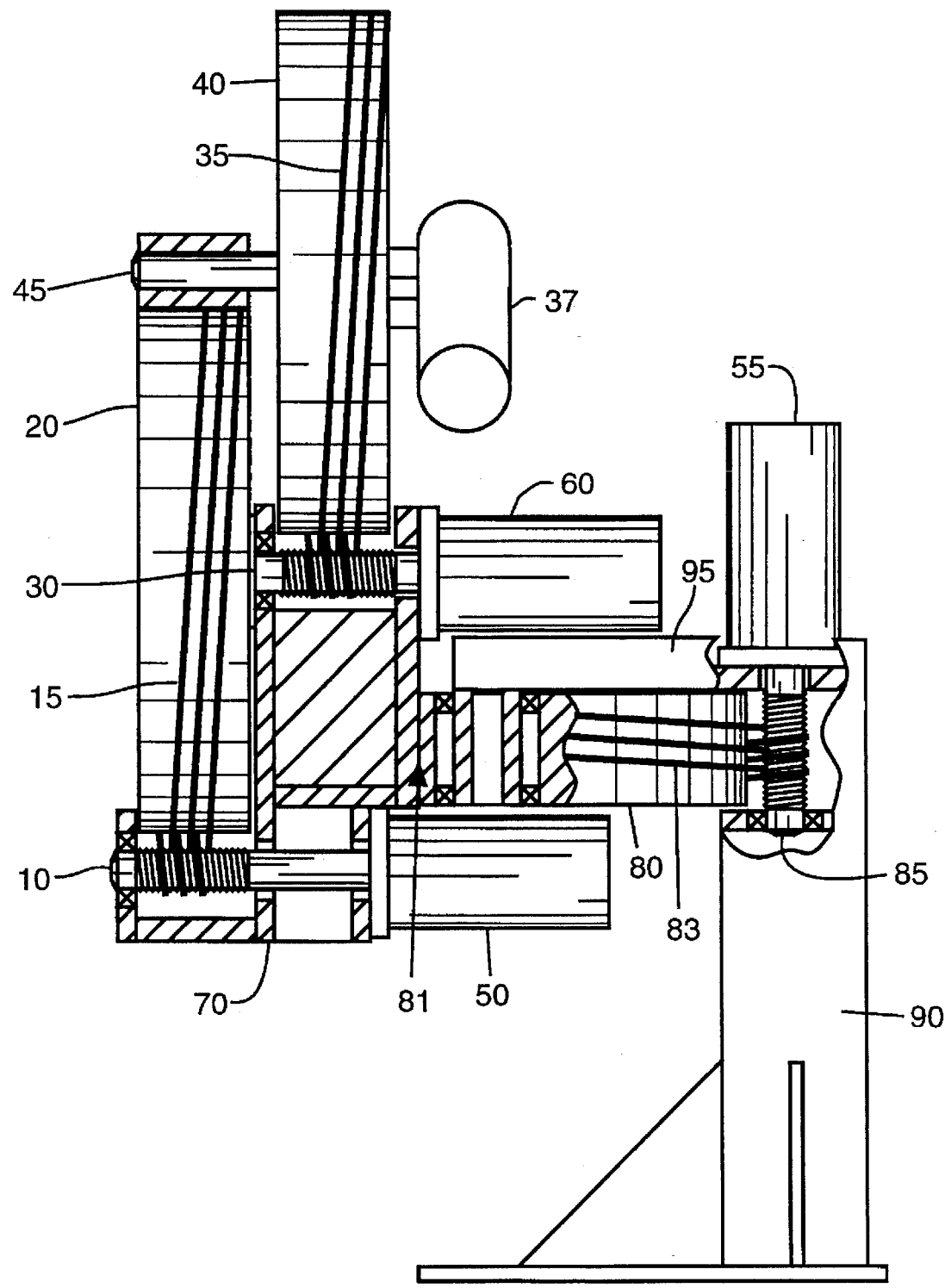
FIG. 6 shows a side view of a 3 degree-of-freedom manipulator of FIG. 5 according to the invention with cutaways showing mounting details.

FIGS. 5 and 6 show the preferred embodiment of the invention. Drive motor 55 is mounted to stationary stand 90. It turns a cylindrical driver member 85. The driver member is coupled to driven drum member 80 by a cable means 83. The larger relative diameter of the driven member over the driver member produces a mechanical advantage for the motor. This rotary drive may be of the type bearing the trademark ROTO-LOK of Sagebrush Technology, Inc. Drum member 80 is not completely circular but has a flat 81 described by a chord line on the circular end cap of the drum. The drum is mounted to the stand by way of fixed cantilevered arm 95.

Support member 70 is mounted to flat 81. Driver member screw 10 receives rotary input from motor 50 and is mounted and journaled for rotation to support member 70. Driven member drum 20 is rotatably mounted to support member 70 and rotationally coupled with screw member 10. The axis of rotation of driven member 20 intersects with and is perpendicular to the drum 80 axis of rotation.

A third rotary drive consists of a driven drum element 40 rotatably mounted to drum element 20, with axis of rotation parallel to that of drum element 20. Driver screw member 30 is rotatably mounted to member 70 with its axis of rotation coaxial to that of drum 20. Screw 30 and drum 40 are rotatably coupled through cable system 35. Motor 60 is mounted to support member 70 and provides rotary input for screw 30.

The radial mounting distance of axle 45 from the center of drum 20, the diameter of screw 30, and the diameter of drum 40 must be selected together to meet the particular applications's drive and workspace requirements while maintaining the required spacing between screw 30 and drum 40 for proper operation of the coupling system.

As drum 20 turns, it causes drum 40 to revolve about its respective driver member 30 at a constant relative spacing. Driver member 30 may therefore turn drum 40 simultaneously with the rotation of drum 20. Motors 50 and 60 remain stationary relative to the turning of driven drums 20 and 40. Additional transmission apparatus is avoided and inertia minimized.

An extension member 37 is mounted to drum 40. The manipulator's tool or end effector would be mounted at the end of this extension member. The member moves the work envelope of the manipulator beyond the diameter of drum 20 and allows the manipulator to reach into confined spaces.

The location of flat 81 and the length of screw 10 are selected to position the centers of gravity of drive motors 50 and 60 close to drum 80's axis of rotation. This positioning minimizes their inertia, allowing faster rotation of drum 80 or a reduction in the size of motor 55.

Figure 7:
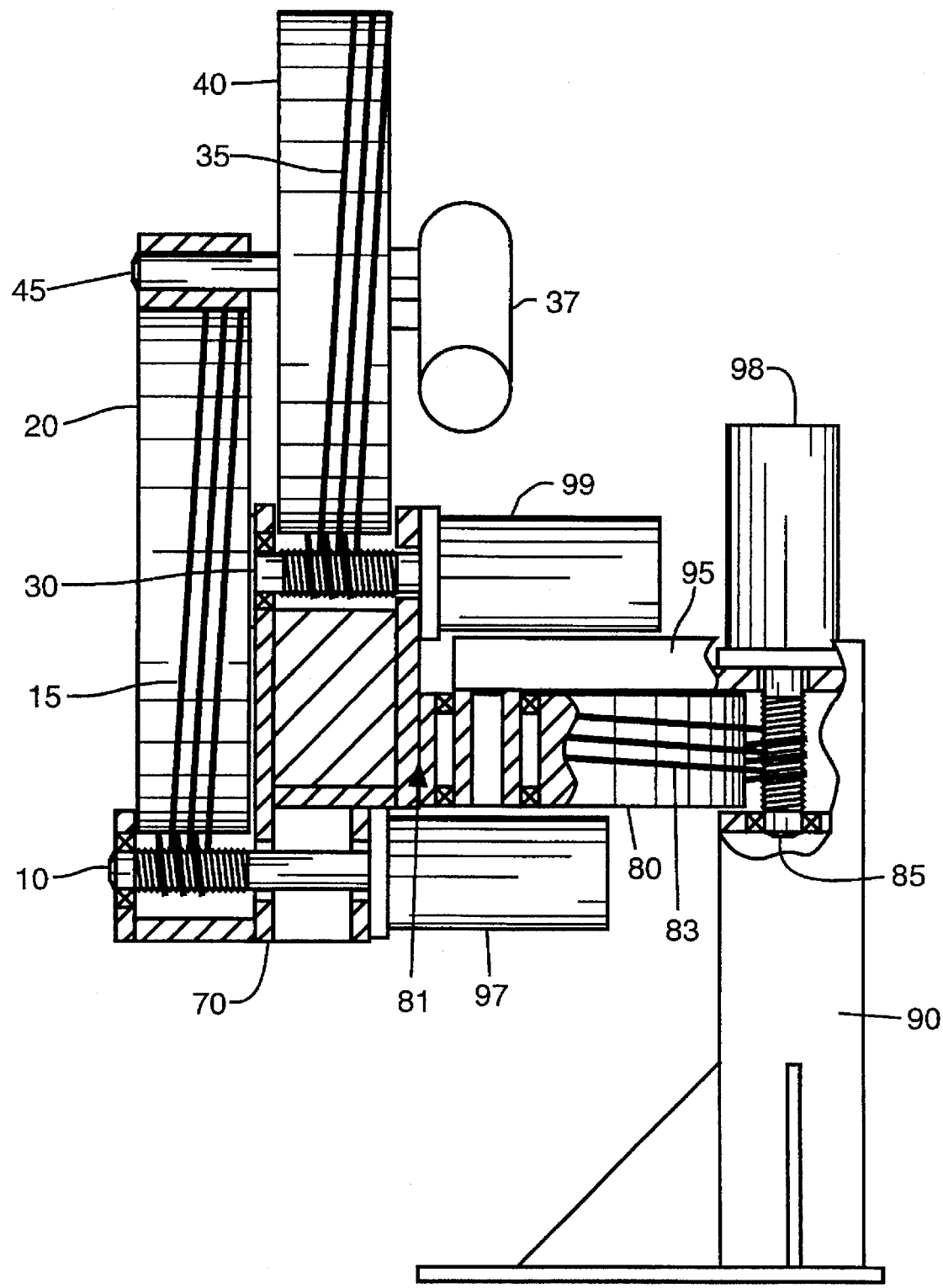
FIG. 7 is another embodiment of the invention.

FIG. 7 shows another embodiment of the invention, where measuring devices 97, 98, and 99 replace motors 50, 55, and 60 to measure the respective positions of the driven members.

This 3 degree-of-freedom manipulator maintains a short mechanical distance between the drive motor and its controlled rotating member for each axis. This produces a manipulator with high stiffness, low friction, and scarcity of components. The component arrangement eliminates the need for belt or chain drives. Additionally, the inertia of the relatively massive drive motors is roughly about its center of mass. This permits fast motion and reduced motor size.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A three degree-of-freedom positioning and manipulating apparatus, comprising:

a first driven member rotatable about a first driven axis;

first driving means coupled to said first driven member for rotating said first driven member about said first driven axis;

a second driven member rotatably mounted to said first driven member for rotating about a second driven axis, with said second driven axis generally perpendicular to said first driven axis;

a second driving means coupled to said second driven member for rotating said second driven member about said second driven axis;

a third driven member rotatably mounted in close proximity to said second driven member for rotating about a third driven axis;

third driving means coupled at a drive point to said third driven member for rotating said third driven member about said third driven axis; and wherein said drive point is generally coincident with said second driven axis.

2. The apparatus of claim 1, said first driven member comprising a cylindrical body, said second driven member and said third driven member each comprising a generally cylindrical body.

3. The apparatus of claim 1, wherein said first driving means is fixedly secured to a stationary member.

4. A three degree-of-freedom positioning and manipulating apparatus, comprising:

a stationary stand;

a first generally cylindrical driven member rotatably mounted to said stand for rotation about a first driven axis;

first drive means mounted to said stand and adjacently disposed to said first cylindrical driven member for controllably rotating said first cylindrical driven member about said first driven axis;

a support member mounted to said first cylindrical driven member;

a second generally cylindrical driven member rotatably mounted to said support member for rotation about a second driven axis, wherein said first driven axis and said second driven axis are generally perpendicular;

second drive means mounted to said support member and adjacently disposed to said second cylindrical driven member for controllably rotating said second cylindrical driven member about said second driven axis;

a third generally cylindrical driven member rotatably mounted in close proximity to said second driven member for rotation about a third driven axis; and a third drive means mounted to said support member and adjacently disposed to said third cylindrical driven member for controllably rotating said third cylindrical driven member about said third driven axis.

5. The apparatus of claim 4, said third drive means comprising a driver member which rotates about a driver axis and which is coupled to said third cylindrical driver member in order to controllably rotate said third cylindrical driver member, and wherein said driver axis is generally coincident with said second driven axis.

6. A three degree-of-freedom positioning and manipulating apparatus, comprising:

a stationary stand supporting a first rotary drive;

said first rotary drive comprising a generally cylindrical first driven member and a generally cylindrical first driver member, said first driver member being rotatable about a first driver axis and coupled to said first driven member whereby rotation of said first driver member rotates said first driven member about a first driven axis, said first driver axis and said first driven axis being generally parallel;

a supporting member fixed to a flat on said first driven member;

a second rotary drive comprising a generally cylindrical second driven member and a generally cylindrical second driver member, said second driver member being rotatable about a second driver axis and coupled to said second driven member whereby rotation of said second driver member rotates said second driven member about a second driven axis, said second driver axis and said second driven axis being generally parallel, and wherein said second driver member and said second driven member are rotatably mounted to said supporting member with said second driven axis generally perpendicular to said first driven axis;

a third rotary drive comprising a generally cylindrical third driven member and a generally cylindrical third driver member, said third driver member being rotatable about a third driver axis and coupled to said third driven member whereby rotation of said third driver member rotates said third driven member about a third driven axis, said third driver axis and said third driven axis being generally parallel, and wherein the third member is rotatably mounted in close proximity to the second driven member for rotation about said third driven axis, said second driven axis and said third driven axis being offset and generally parallel, and said third driver axis being generally coincident with said second driven axis; and wherein said first driver member is coupled to said first driven member by a first cable means, said second driver member is coupled to said second driven member by a cable means, and said third driver member is coupled to said third driven member by a cable means.

7. The apparatus of claim 6 with an arm fixedly secured to said third driven member.

8. The apparatus of claim 6 in which the first, second, and third driver members each receive a respective rotary input from a respective first, second, and third mechanical rotary power source.

9. The apparatus of claim 8, wherein a non-rotating component of said first mechanical rotary power source is mounted to said stand, and wherein a non-rotating component of said second and of said third mechanical rotary power sources is mounted to said support member.

10. The apparatus of claim 8 wherein a rotating component of said first mechanical rotary power source is rotatably mounted to said stand, and wherein a rotating component of said second and of said third mechanical rotary power sources is rotatably mounted to said support member.

11. The apparatus of claim 8 wherein said first driven axis passes through the bodies of said second and of said third mechanical rotary power sources.

12. A three degree-of-freedom positioning and manipulating apparatus, comprising:

a stationary stand supporting a first rotary drive;

said first rotary drive comprising a generally cylindrical first driver member and a generally cylindrical first driven member, said first driver member being rotatable about a first driver axis and coupled to said first driven member whereby rotation of said first driver member rotates said first driven member about a first driven axis, said first driver axis and said first driven axis being generally parallel;

a supporting member fixed to a flat on said first driven member;

a second rotary drive comprising a generally cylindrical second driven member and a generally cylindrical second driver member, said second driver member being rotatable about a second driver axis and coupled to said second driven member whereby rotation of said second driver member rotates said second driven member about a second driven axis, said second driver axis and said second driven axis being generally parallel, and wherein said second driver member and said second driven member are rotatably mounted to said supporting member with said second driven axis generally perpendicular to said first driven axis;

a third rotary drive comprising a generally cylindrical third driven member and a generally cylindrical third driver member, said third driver member being rotatable about a third driver axis and coupled to said third driven member whereby rotation of said third driver member rotates said third driven member about a third driven axis, said third driver axis and said third driven axis being generally parallel, and wherein the third driven member is rotatably mounted in close proximity to the second driven member for rotation about said third driven axis, said second driven axis and said third driven axis being offset and generally parallel, and said third driver axis being generally coincident with said second driven axis.

13. The apparatus of claim 12 with an arm fixedly secured to said third driven member.

14. The apparatus of claim 12 in which the first, second, and third driver members each receive a respective rotary input from a respective first, second, and third mechanical rotary power source.

15. The apparatus of claim 14 wherein a non-rotating component of said first mechanical rotary power source is mounted to said stand, and wherein a non-rotating component of said second and of said third mechanical rotary power sources is mounted to said support member.

16. The apparatus of claim 14 wherein a rotating component of said first mechanical rotary power source is rotatably mounted to said stand, and wherein a rotating component of said second and of said third mechanical rotary power sources is rotatably mounted to said support member.

17. The apparatus of claim 14 wherein said first driven axis passes through the bodies of said second and of said third mechanical rotary power sources.

18. A three degree-of-freedom measuring apparatus, comprising:

a stationary stand supporting a first rotary drive;

said first rotary drive comprising a generally cylindrical first driver member and a generally cylindrical first driven member, said first driver member being rotatable about a first driver axis and coupled to said first driven member whereby rotation of said first driver member rotates said first driven member about a first driven axis, said first driver axis and said first driven axis being generally parallel;

a supporting member fixed to said first driver member;

a second rotary drive comprising a generally cylindrical second driven member and a generally cylindrical second driver member, said second driver member being rotatable about a second driver axis and coupled to said second driven member whereby rotation of said second driver member rotates said second driven member about a second driven axis, said second driver axis and said second driven axis being generally parallel, and wherein said second driver member and said second driven member are rotatably mounted to said supporting member with said second driver axis generally perpendicular to said first driver axis;

a third rotary drive comprising a generally cylindrical third driven member and a generally cylindrical third driver member, said third driver member being rotatable about a third driver axis and coupled to said third driven member whereby rotation of said third driver member rotates said third driven member about a third driven axis, said third driver axis and said third driven axis being generally parallel, and wherein the third driver member is rotatably mounted in close proximity to the second driver member for rotation about said third driver axis, said second driver axis and said third driver axis being offset and generally parallel, and said third driven axis being generally coincident with said second driver axis;

a first measuring means coupled to said first driven member;

a second measuring means coupled to said second driven member; and a third measuring means coupled to said third driven member.

* * * * *